June 27, 1961   G. H. LOVINS   2,990,256
CRYSTAL GROWING APPARATUS
Filed May 1, 1957
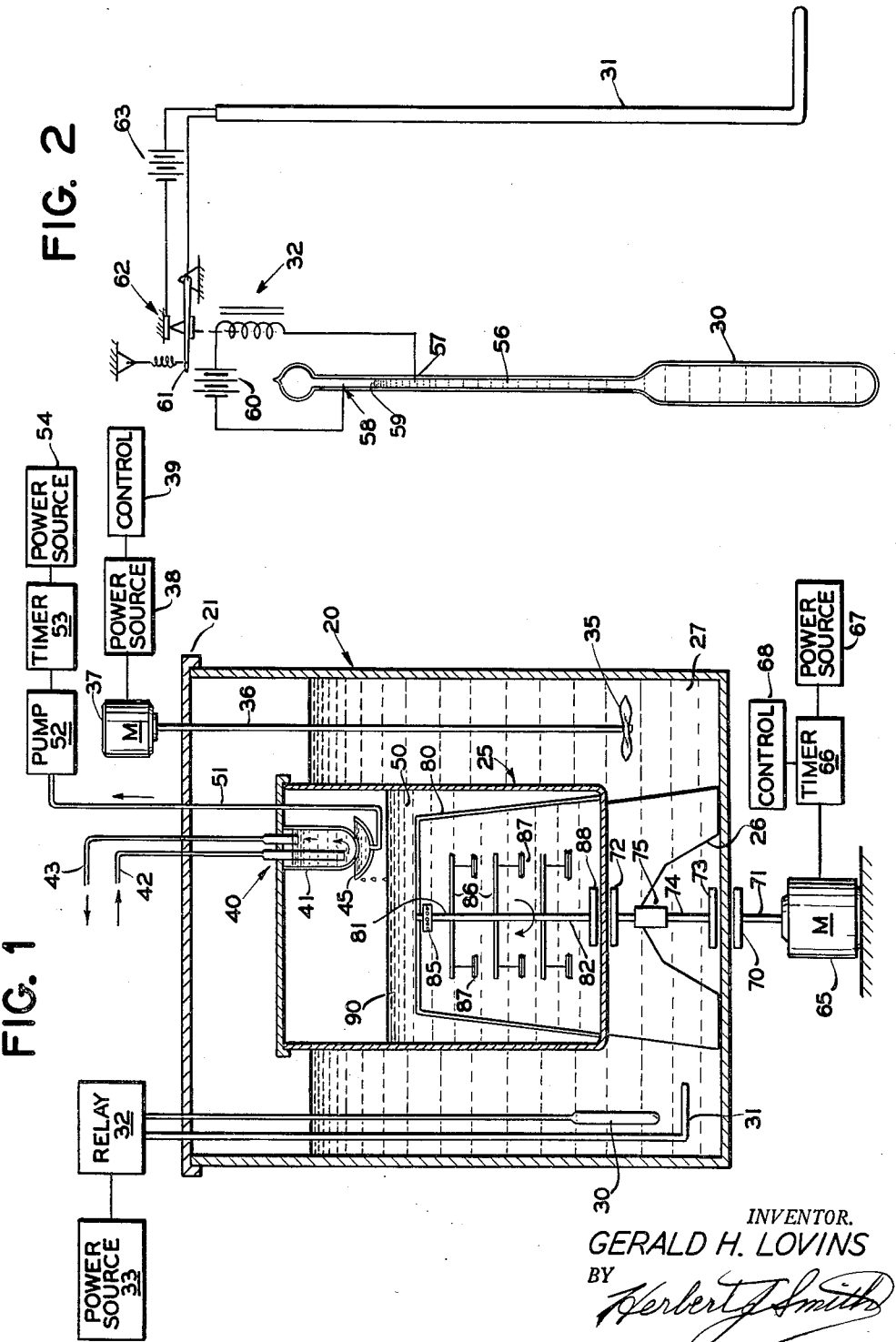
INVENTOR.
GERALD H. LOVINS
BY
ATTORNEY

United States Patent Office 2,990,256
Patented June 27, 1961

2,990,256
CRYSTAL GROWING APPARATUS
Gerald H. Lovins, Upper Montclair, N.J., assignor to Curtiss-Wright Corporation, a corporation of Delaware
Filed May 1, 1957, Ser. No. 656,427
1 Claim. (Cl. 23—273)

This invention relates to apparatus for growing crystals from solutions, and it is therefore an object of the invention to provide a novel crystal growing assembly allowing a symmetrical geometry for optimum solution circulation conditions.

Another object of the invention is to provide novel apparatus for eliminating all protrusions from a solution utilized for growing crystals.

Another object is to provide a device whereby a more homogeneous solution is maintained for growing crystals.

A further object is to provide novel means for eliminating all protrusions from a solution used for growing crystals.

A further object is to provide novel apparatus for growing crystals wherein more efficient use of the space in the vessel is permitted for fundamental operations.

The invention contemplates apparatus for growing crystals wherein the crystal seeds are suspended on a "tree" disposed in the crystal growing solution, the tree being suspended, normally, from a framework disposed below the surface of said solution. Further, the "tree" is rotatable by magnetic means. The entire surface of the crystal growing solution is uninterrupted by any protuberances from the apparatus confined within the vessel or container holding the solution. Magnetic means may be used to provide relative motion between the crystals being grown and the solution.

In the art of growing large single crystals from a seed crystal in water solution, it is important that uniform and thorough agitation be maintained to assure equilibrium and uniform growth. A rack or "tree" on which crystal seeds are suspended is disposed within the crystal growing solution and is usually suspended from the upper edge of the vessel containing the solution. Further, a thermoregulator and a heater are also inserted in the solution. Consequently, these various devices must be placed in the liquid and suspended from above the surface thereof.

Whenever a rod or other form of material protrudes from the crystal growing solution, there is a tendency for the solution to creep up the protrusion due to surface tension effects. If the vapor space above the solution surface is unsaturated, then crystallization will take place on the protrusion in an uncontrolled manner. Consequently, this uncontrolled crystallization will upset any attempted controlled crystal growth elsewhere in the solution. One method of treating the uncontrolled crystallization above the surface of the liquid is to insert a small reflux condenser in the vapor space and direct the condensate to the surface of the protrusion, thus permitting the condensate to keep the protrusion washed free of crystals.

The present invention obviates the above undesirable condition.

In the drawings, FIG. 1 is a partial sectional view and block diagram showing one form of the invention. FIG. 2 is a representative wiring diagram of the thermoregulator control which may be employed with the invention.

Referring to the drawings, there is shown an outer container 20 having an outer container closure 21 which fits snugly on the top of the conventional type outer container. A crystal growing solution container 25 is supported on a solution container rack 26. A temperature-controlled liquid 27 is disposed within the outer container 20 and has its upper surface level somewhat below the upper edge of the solution container 25. A thermoregulator 30 and a heater 31 are shown connected to a relay 32. The thermoregulator and heater are disposed within the liquid for controlling the temperature thereof. A power source 33, which may feed more than one circuit, is connected to the relay. The thermoregulator and heater are connected through apertures in the closure 21. An impeller 35 is connected on the impeller shaft 36, which is driven by the motor 37. A power source 38 and a control 39 for the power source and motor are shown for operating the impeller 35 for stirring or controlled agitation of the liquid 27. A conventional reflux condenser has an envelope 41 connected to the underneath side of cover 40 of the solution container 25. Water inlet and outlet passages 42 and 43, respectively, are connected to the two open-ended tubes disposed within the envelope 41, for the purpose of circulating cool liquid through the envelope 41 to keep the envelope relatively cool in relation to the vapor above the surface of the liquid in the inner container. The operation of reflux condensers is well-known and, briefly, the cool water enters through the inlet tube and partially fills the envelope 41. The cool water is forced out of the outlet 43, thereby providing a circulation of liquid within the envelope 41 to keep the outer surface thereof cool. The vapor from the crystal growing solution 50 will condense on the outer surface of the envelope 41 and the liquid will then drop into a cup 45, which when filled will overflow back into the crystal growing solution. A tube 51 is connected from the cup 45 to a pump 52, which in turn is connected to a timer 53 and a power source 54. The timer is actually a program device for operating the pump in a predetermined controlled condition for removing the water from the cup as desired to assist in control of the crystal growing.

In FIG. 2, the thermoregulator 30 and the heater 31 are shown connected to the relay 32. A column of mercury 56 in the thermoregulator touches one contact 57, while a second contact 58 is positioned above the surface of the column of mercury 59 so that as the temperature of the solution 27 increases, the column of mercury will rise and close a circuit between the contacts 57 and 58, thereby energizing the relay 32 from the battery 60, causing armature 61 to be drawn downwardly. The movement of the armature 61 opens the contact set 62, so that the current from battery 63 will be cut off from the heater 31, thereby permitting the temperature of the liquid 27 to drop.

A motor 65 is connected with a timer 66, a power source 67, and a control 68 for said timer. A drive magnet 70, which may be a bar magnet supported on the rotor shaft 71, is disposed below the surface of the outer container 20. A coupling means includes an upper coupling magnet 72, a lower coupling magnet 73, and a shaft 74 connecting said upper and lower coupling magnets, with said shaft being supported by a bearing 75 supported by the rack 26 in any convenient manner. A frame 80 may be merely a simple wire structure shown as a pair of inverted U-shaped members supported on the bottom of the solution container 25. A "tree" 81 has a vertical stem 82 with one end secured to the upper portion of the frame 80 by a ball bearing 85. A plurality of branches 86 are supported by the stem 82, and crystals 87 being grown in the solution are supported by said branches. In order to rotate the "tree," a driven magnet 88, which may be a bar magnet, is secured to the lower end of the stem 82 but spaced from the bottom of the inner container. When the drive magnet 70 is properly aligned with the driven magnet 88 by means of the upper and lower magnets 72 and 73, respectively, any rotation of the motor 65 will cause the drive magnet 70 to, in turn, rotate magnets 73, 72, and the driven magnet 88, thereby rotating the "tree" 81 and causing a relative motion between the crystals and the crystal growing solution 50 within the container 25.

While a specific arrangement is shown for rotating the "tree" 81, it is to be understood that a watertight motor built particularly for immersion within liquids may be disposed within the outer container, and the drive magnet 70 may drive the driven magnet 88 directly.

Further, a "tree" such as 81 may be provided without a driven magnet such as 88. The arrangement then may be to hold the "tree" 81 stationary and provide a conventional magnetic stirring bar within the liquid at the base thereof. With this arrangement, any drive magnet, whether used with or without coupling means, may be employed to cause stirring of the stirring bar, so that the crystals on the "tree" may be held stationary and relative motion between the crystal growing solution and the crystals will be provided by operation of the motor, which in turn causes rotation of the stirring bar. Although only one embodiment of the invention has been illustrated and described in detail, it is to be expressly understood that invention is not limited thereto. Various changes can be made in the design and arrangement of the parts without departing from the spirit and scope of the invention as will now be understood by those skilled in the art.

What is claimed is:

Crystal growing apparatus comprising a closed outer chamber for holding a temperature controlled liquid and including liquid temperature control means and an agitator therefor; a closed crystallization chamber; a rack for supporting said crystallization chamber in said outer chamber in a spatial relationship with said outer chamber; a rotatable crystal tree for supporting crystal seeds mounted in said closed crystallization chamber; driven means coupled to said crystal tree; and drive means mounted externally of said outer chamber magnetically coupled to said driven means for rotating said crystal tree in said closed crystallization chamber.

References Cited in the file of this patent

UNITED STATES PATENTS

| | | |
|---|---|---|
| 1,347,350 | Moore | July 20, 1920 |
| 1,746,144 | Christopher | Feb. 4, 1930 |
| 2,650,256 | Lingane | Aug. 25, 1953 |
| 2,793,941 | Estes | May 28, 1957 |
| 2,859,020 | Eddy | Nov. 4, 1958 |